United States Patent [19]
Benedetto et al.

[11] Patent Number: 5,209,544
[45] Date of Patent: May 11, 1993

[54] CONVERTIBLE AUTOMOBILE

[75] Inventors: Carmelo Benedetto; Alberto Bertelli, both of Milan, Italy

[73] Assignee: Fiat Auto S.p.A., Turin, Italy

[21] Appl. No.: 859,757

[22] Filed: Mar. 30, 1992

Related U.S. Application Data

[63] Continuation-in-part of Ser. No. 743,767, Aug. 12, 1991, abandoned.

[30] Foreign Application Priority Data

Sep. 21, 1990 [IT] Italy ................... 21536 A/90

[51] Int. Cl.$^5$ ........................... B60J 7/08; B60J 7/20
[52] U.S. Cl. ........................... 296/107; 296/136; 296/146 L
[58] Field of Search ............ 296/107, 116, 136, 146 L

[56] References Cited

U.S. PATENT DOCUMENTS

| | | | |
|---|---|---|---|
| 2,596,355 | 5/1952 | Ackermans | 296/107 |
| 4,776,630 | 10/1988 | Fukutomi et al. | 296/107 |
| 5,090,764 | 2/1992 | Kogawa et al. | 296/107 |

Primary Examiner—Dennis H. Pedder
Attorney, Agent, or Firm—Longacre & White

[57] ABSTRACT

A convertible automobile in which the body is provided with a housing having a cover element and located to the rear of a pair of seats in proximity to the rear axle, and with a roof panel connecting the windscreen to the rear window; the roof panel, the windscreen, the rear window and the body define the automobile passenger compartment; the roof panel and the rear window are two rigid elements which are separated from each other and are mobile between a position in which they define the passenger compartment roof and a position in which the passenger compartment is uncovered. The roof panel and rear window remain connected to the body of the automobile during each stage of the uncovering of the automobile and of their positioning in the housing.

3 Claims, 4 Drawing Sheets

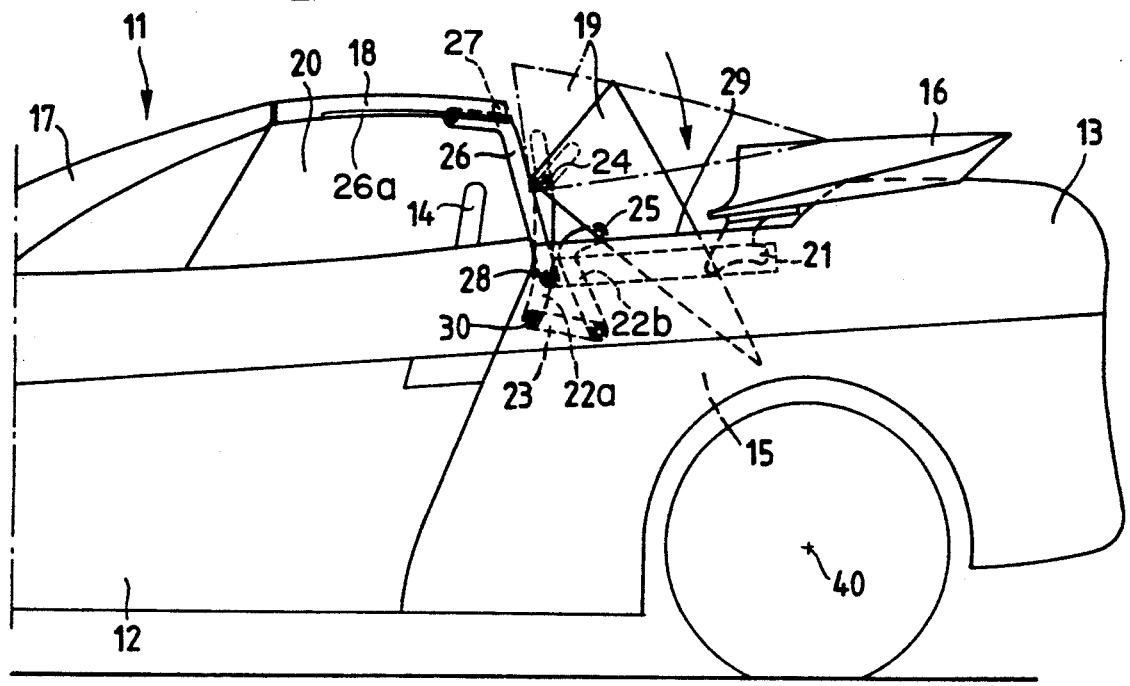
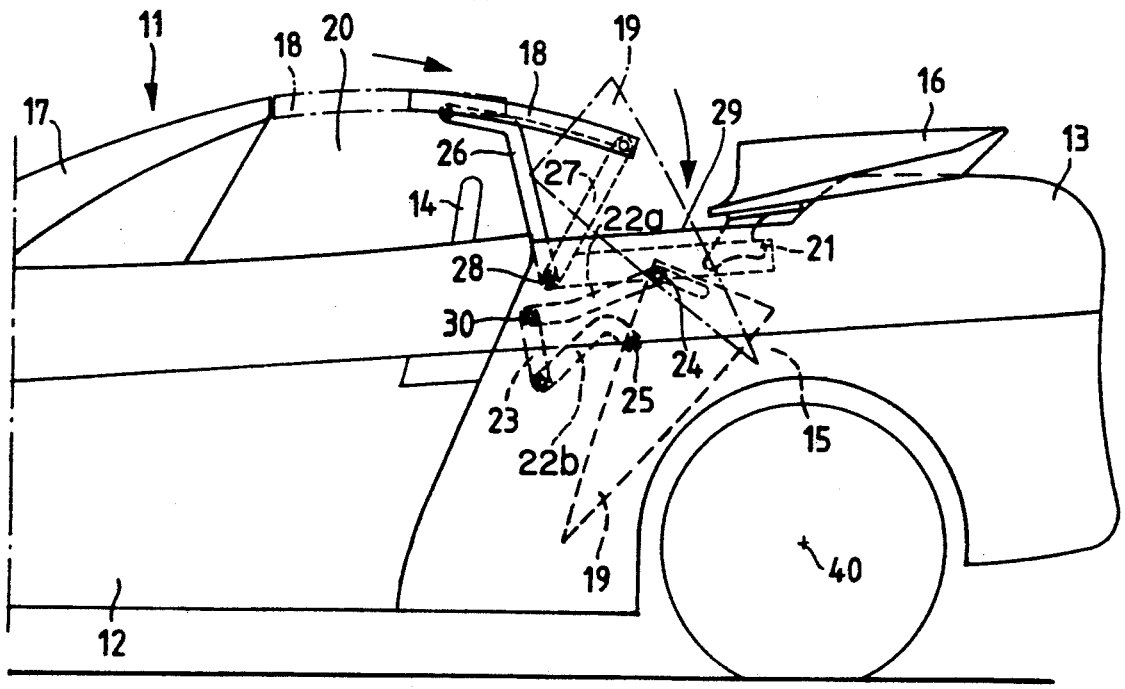

CONVERTIBLE AUTOMOBILE

BACKGROUND OF THE INVENTION

This application is a continuation in part of U.S. patent application Ser. No. 07/743,767 filed Aug. 12, 1991, now abandoned.

FIELD OF THE INVENTION

This invention relates to a convertible automobile. These types of automobiles permit the operator to open the roof section in a manner to expose the passenger compartment section to the outside environment.

DESCRIPTION OF THE RELATED ART

Innumerable automobiles of this type are known in which the passenger compartment roof is generally constructed of a non-rigid material which can be easily folded, for example in the manner of bellows, behind a pair of seats.

These types of automobile always present considerable problems in terms of gasket sealing, air infiltration, roof material deterioration and noise.

Other automobiles of this type have been constructed with a roof panel of rigid material which can be dismantled and stored in suitable compartments in the automobile or even removed from the automobile altogether. This construction has obvious problems in terms of space requirements and the slowness of the operations involved in disengaging, storing and re-engaging the roof panel.

SUMMARY OF THE INVENTION

The object of the present invention is to provide a passenger compartment roof which is constructed of rigid elements but which can be disassembled such that by means of suitable movements it can be stored automatically or semi-automatically in a suitable housing provided to the rear of a pair of seats.

This object is attained according to the present invention by a convertible automobile in which the body is provided with a housing having a cover element and located to the rear of a pair of seats in proximity to the rear axle, and with a roof panel connecting the windscreen to the rear window, said roof panel, said windscreen, said rear window and said body defining the passenger compartment of said automobile, characterized in that said roof panel and said rear window are two rigid elements which are separate from each other and are mobile between a position in which they define the passenger compartment roof and a position in which said passenger compartment is uncovered, said cover element of said housing being slidingly movable towards a rear position on said body to enable said rear window and said roof panel to disappear into said housing by means of successive rotary and translational movements.

The cover element of the housing is slidingly mobile by means of a pair of guides engaged with internal walls of said body. In one embodiment of the present invention the rear window is hinged on at least one side to a pair of levers connected together by a crosspiece, at least one of said levers having a hinge point positioned approximately within a middle portion of the side of said body, said hinge enabling said rear window to enter said open housing in a position close to said axle by undergoing an upward translational movement and a downward rotary movement.

The roof panel is fixed to a system of levers, at least one of which is essentially of L-shaped and which have a hinge point positioned within a portion of said body close to its upper edge, said system of levers being able to move said roof panel with translational movement towards said housing and to rotate said roof panel so that it positions itself to the front of said rear window within said housing.

According to the invention an electro-hydraulic or electro-mechanical drive may be provided for the translational movement and rotation of said rear window and said roof panel.

The structural and operational characteristics and advantages of convertible automobile according to the present invention will be more apparent from the description given hereinafter by way of non-limiting example with reference to the accompanying schematic drawings, in which:

BRIEF DESCRIPTION OF THE DRAWINGS

FIGS. 1 and 1a, 2 to 6 are side elevational views of an automobile according to the present invention with the component elements of the passenger compartment roof in different operating positions.

DESCRIPTION OF THE PREFERRED EMBODIMENT

Figure 1:
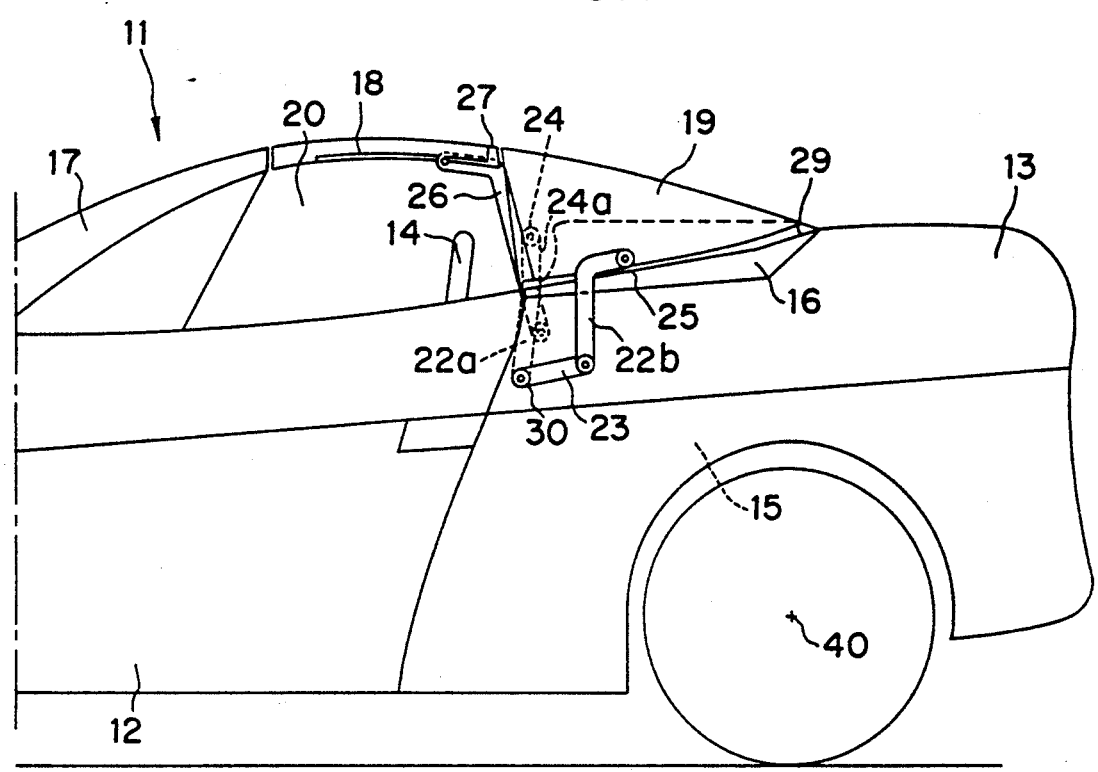

In the figures the reference numeral 11 indicates overall an automobile according to the invention and 12 its body, of which the rear portion is indicated by 13.

In the body portion 13 there is provided, to the rear of a pair of seats 14, a housing 15 having a cover element 16 and positioned in proximity to the automobile rear axle 40.

Figure 7:
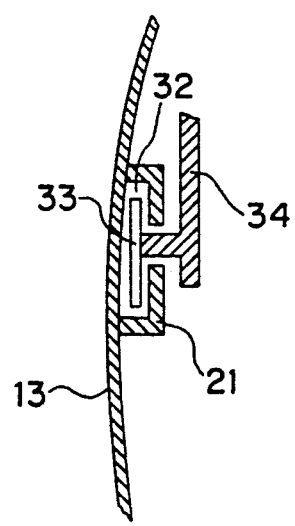
FIG. 7 is a sectional view of the guide mechanism of the instant invention engaging the inner wall of a body portion.

The windscreen 17, the roof panel 18 and the rear window 19 together define the passenger compartment 20 of the automobile. The cover element 16 of the housing 15 is slidingly movable towards the rear portion of the body 12 by means of a pair of guides 21 which engage the inner walls of the body portion 13 as shown in FIG. 7. The guide 21 is composed of two L-shaped portions which face each other and together define a hole or slot 32. This hole 32 is a track for a T-shaped portion 33 disposed on a portion 34 of the cover element 16. The rear window 19 is fixed on each side to a pair of levers 22a and 22b, connected together by a crosspiece 23. Hinges 24 and 25 enable the rear window to undergo translational and rotary movements. Hinge point 24 is a slot type rotary connection between lever 22a and the window panel 19. Such connections are well known in the art as shown in U.S. Pat. No. 2,596,355 to Ackermans. Accordingly, the rotary hinge 24 is permitted to slide within slot 24a between a position where the window 19 rests on rear portion 13 of the car body 12 (FIG. 1) and a position where the window is raised upwards by a distance defined by the length of slot 24a (FIGS. 1a and 2).

A hinge point 30, 31 for the pair of levers 22a and 22b respectively, is provided within an approximately middle portion of the body side. Hinge points 30, 31 permits only rotary movement of levers 22a and 22b.

The roof panel 18 is hinged to a system of levers indicated by 26 and 27, the hinge point 28 of one end of levers 26 and 27 is situated in a position close to the upper edge 29 of the body. The other end of lever 27 is rotatably hinged to the rearward end of roof panel 18 while the other end of lever 26 is hinged to the roof panel 18 by a slotted type rotary connection. During operation, lever 26 translates along the roof panel 18 in a slot 26a provided in the roof panel 18. Lever 27 creates the rearward translational movement of roof panel 18 by rotating about the hinge point 28.

According to one embodiment of the present invention, the articulated connections constituted by the hinged levers for the rear window and roof panel and also the movable cover element can be operated by an electro-hydraulic or electro-mechanical system. These systems must be synchronized to enable the configuration of the automobile passenger compartment to be modified, as shown in FIGS. 1 to 6. According to another embodiment of the present invention, the rotary and translational movements may be manually actuated or semi-automatically actuated to enable the component elements of the passenger compartment to move between the position defining the passenger compartment and the position in which the passenger compartment is uncovered in the manner shown in FIGS. 1 to 6.

Figure 1A:
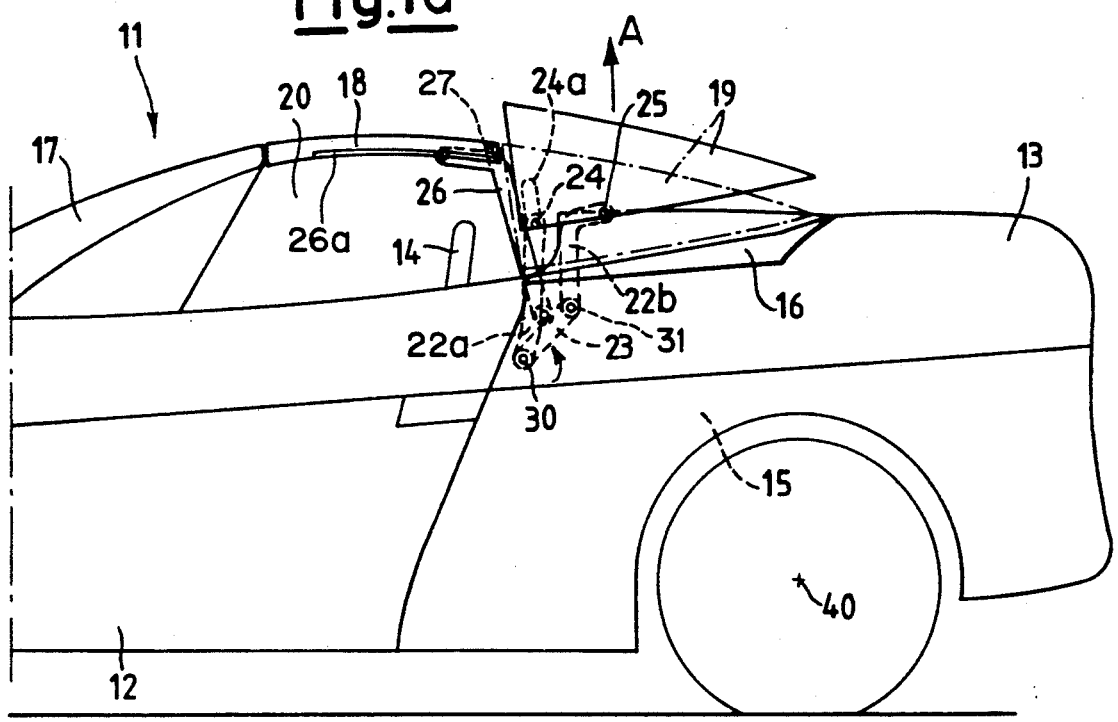
Figure 2:
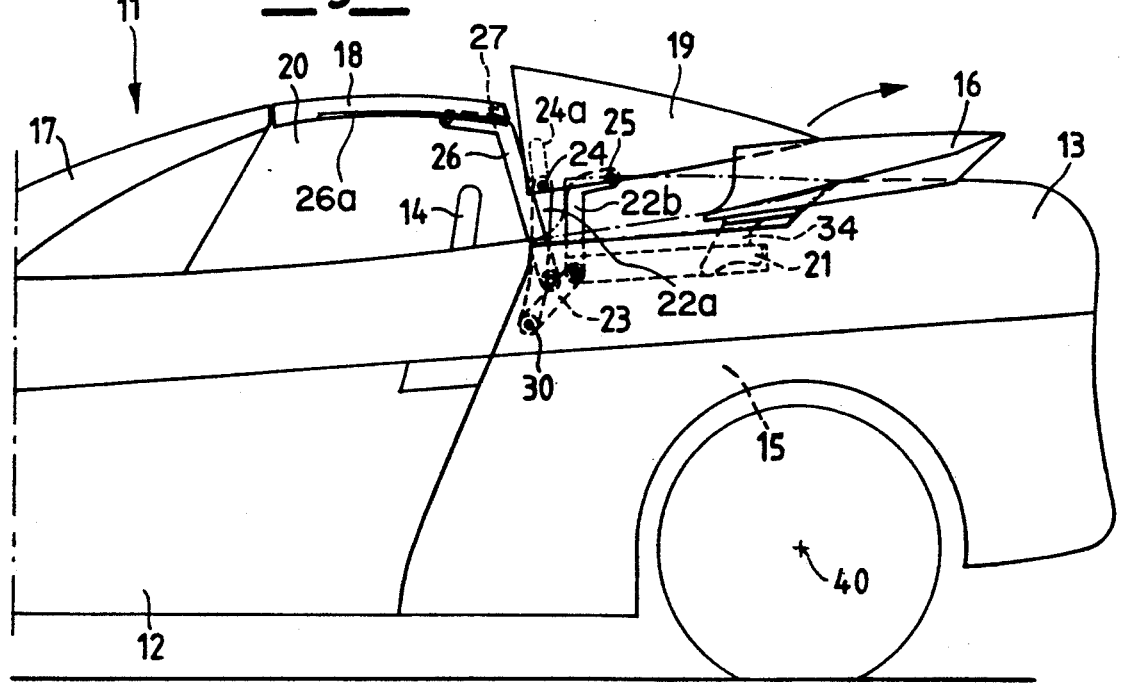

Specifically, FIG. 1 shows a first stage in which the rear window is in a position resting on the upper edge 29 of the car body 12. FIG. 1a shows a next stage in which the rear window 19 is raised upwards. The raising of window 19 is accomplished by the rotation of lever 23 about the hinge 30. Because the hinge 24 is permitted to slide within slot 24a, the window moves in a direction indicated by the arrow A of FIG. 1a. When hinge 24 reaches the lower end of slot 24a as shown in FIGS. 1a and 2, the hinge 24 may be secured within slot 24a to prevent a return of hinge 24 to the position in slot 24a shown in FIG. 1.

In FIG. 2 the rear window 19 remains in the same upward position while the cover element 16 slides towards the rear of the body, via guides 21, to thus leave the space required to rotate the rear window 19 for its insertion into the housing 15.

As shown in FIGS. 3 and 4, the rear window 19 is next rotated about hinge 24 for insertion into the housing 15. This is accomplished by temporarily maintaining the hinge 24 in the lower end of slot 24a (shown in FIG. 3) while rotating lever 23 in a clockwise direction. Once the lever has rotated a predetermined amount determined when the lever 22b is in the proximity of lever 22a, the lever 22a is rotated in the clockwise direction. The rear window 19 is thus inserted into the housing 15 to the rear of seats 14 in proximity to the rear axle 40.

Figure 5:
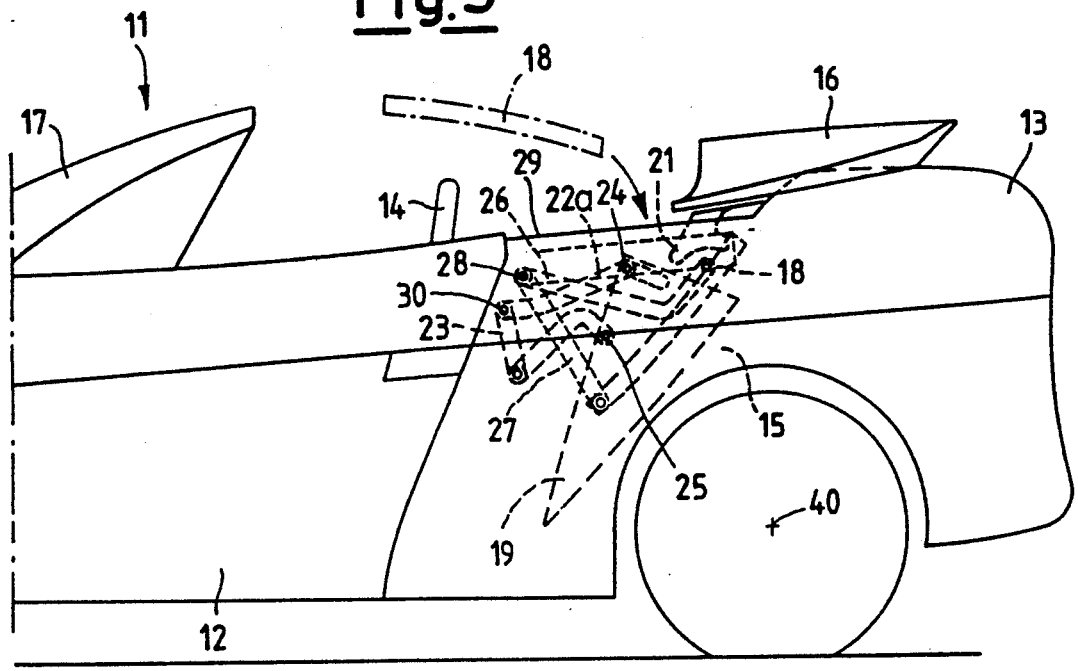

FIGS. 4 and 5 show the translational and rotary movements of the roof panel 18, which is inserted into the housing 15 in front of the rear window 19. During operation, the lever 27 is pivoted about the hinge point 28 in a clockwise direction. As lever 27 is pivoted in this manner, the lever 26 translates along the roof panel 18 in a slot 26a provided in the roof panel 18. This slot type rotary translation provides the necessary support for the roof panel 18 as the levers 26 and 27 become situated in spaced relation to each other. The roof panel 18, rear window 19 and their respective lever systems are dimensional designed for adequately storage within the housing 15.

Figure 6:
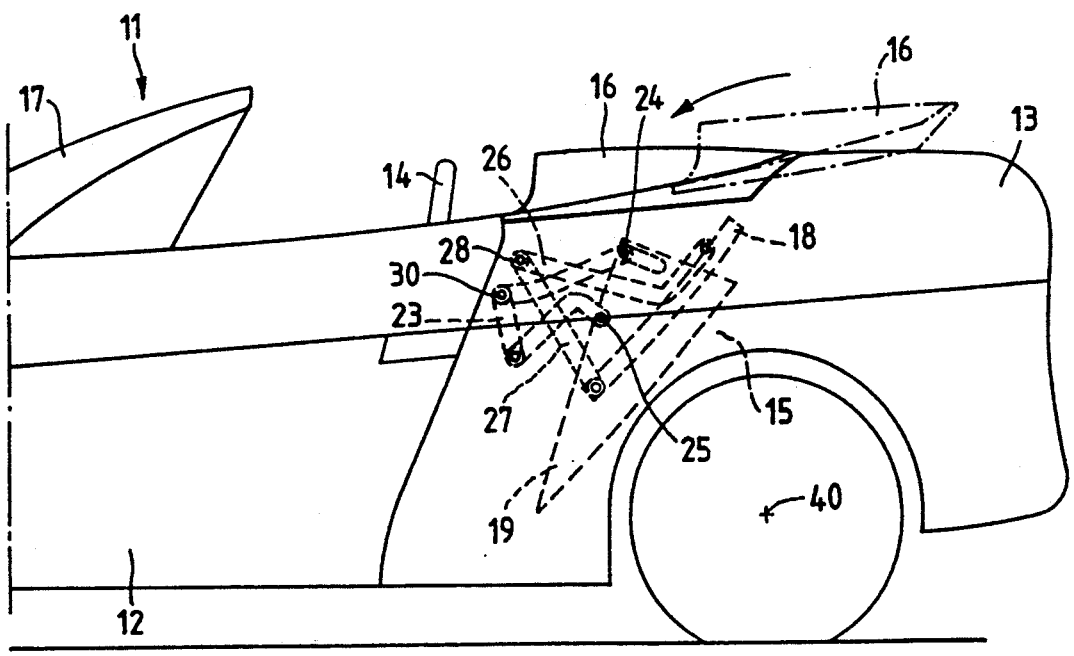

FIG. 6 shows the final stage of this modification of the configuration of an automobile passenger compartment, in which the cover element 16 again slides frontwards to cover the housing in which the rear window 19 and roof panel 18 have been stored.

The roof panel and rear window as described in the present invention can be constructed of rigid materials, so giving the automobile an improved tightness against both water and air, with an undoubted improvement in noise characteristics.

As previously stated, the rotary and translational movements of the lever systems described above are actuated by any suitable electro-hydraulic, electro-mechanical, or manual system, examples of which are shown in U.S. Pat. No. 2,596,355 to Ackermanns and U.S. Pat. No. 4,776,630 to Fukutomi et al.. However, these systems must be synchronized to enable the configuration of the automobile passenger compartment to be modified, as shown in FIGS. 1 to 6.

In practice a convertible automobile is obtained having the same characteristics as an automobile the passenger compartment of which is covered with a fixed rigid structure.

We claim:

1. A convertible automobile having a windscreen in which the body is provided with a housing, said automobile comprising:

a cover element located to the rear of a pair of seats in proximity to the rear axle and connected to said body by slide means for sliding said cover rearwardly with respect to said body;

a rear window connected to said body by first linkage means for moving said rear window upwardly and rotatively downwardly with respect to said vehicle body, and a roof panel connected to said body by second linkage means for moving said roof panel rearwardly and rotatively downwardly with respect to said vehicle body, said roof panel connecting the windscreen to the rear window, said roof panel, said windscreen, said rear window and said body defining a passenger compartment of said automobile, wherein, said roof panel and said rear window are two rigid elements which are separate from each other and are mobile between a first position in which they define the passenger compartment roof and a second position in which said passenger compartment is uncovered, said first linkage means being adapted to move said rear window upwardly with respect to said automobile body, and said cover element of said housing being slidingly movable on said slide means from a forward position substantially within said passenger compartment towards a rearward position on said body to clear a rearmost portion of said rear window and enable said rear window first linkage means to rotate downwardly towards the rear axle of the automobile, said roof panel being movable rearwardly on said body by said second linkage means to a position above said rear window and being rotatable downwardly towards the rear axle of said automobile so that said roof panel and rear window disappear into said housing by means of said first and second linkage means.

2. A convertible automobile as claimed in claim 1, characterized in that said slide means comprises a pair of guides engaged with internal walls of said body.

3. A convertible automobile as in claim 1, wherein: said roof panel and rear window are nested in said second position inside said housing of said automobile body near said rear axle.

* * * * *